United States Patent [19]
Wendte

[11] Patent Number: 5,771,169
[45] Date of Patent: Jun. 23, 1998

[54] SITE-SPECIFIC HARVEST STATISTICS ANALYZER

[75] Inventor: Keith W. Wendte, Lemont, Ill.

[73] Assignee: Case Corporation, Racine, Wis.

[21] Appl. No.: 704,990

[22] Filed: Aug. 29, 1996

[51] Int. Cl.⁶ .................................................. G06F 17/60
[52] U.S. Cl. ............................................................ 364/420
[58] Field of Search .................................. 364/420, 806, 364/578; 395/904, 928, 930

[56] References Cited

U.S. PATENT DOCUMENTS

| | | |
|---|---|---|
| Re. 35,100 | 11/1995 | Monson et al. . |
| 5,214,757 | 5/1993 | Mauney et al. . |
| 5,377,102 | 12/1994 | Nishiishigaki ......................... 364/420 |
| 5,379,215 | 1/1995 | Kruhoeffer et al. ..................... 364/420 |
| 5,467,271 | 11/1995 | Abel et al. . |
| 5,497,149 | 3/1996 | Fast . |
| 5,546,107 | 8/1996 | Deretsky et al. ....................... 364/420 |
| 5,684,476 | 11/1997 | Anderson ............................... 364/420 |
| 5,689,418 | 11/1997 | Monson ................................. 364/420 |
| 5,699,244 | 12/1997 | Clark, Jr. et al. ....................... 364/420 |

FOREIGN PATENT DOCUMENTS 0 635   1/1995   European Pat. Off. .

OTHER PUBLICATIONS

*Advanced Farming Systems*, Case Corporation ©1996.
*John Deere Greenstar Combine Yield–Mapping System*, John Deere (Brochure Date unknown).
*Greenstar Combine Yield–Mapping System*, John Deere (Brochure date unknown).
*Hiniker 8200 Monitor the Most Versatile Low Cost Acre Monitor on the Market*, Hinike Company (Date unknown).
*Hiniker 8150 Control System*, Hiniker Company (Brochure date unknown).

*Primary Examiner*—Donald E. McElheny, Jr.
*Attorney, Agent, or Firm*—Foley & Lardner

[57] ABSTRACT

Disclosed herein is a method and apparatus for analyzing statistical data for a region of a farming field defined by a boundary on a set of georeferenced agricultural maps of the field. Input data includes digital maps of the field which represent spatially-variable characteristics. The characteristics may represent soil properties, crop properties and farming inputs applied to the field. The characteristic data is georeferenced to specific field locations by longitude and latitude coordinates. An electronic display is used to display a visual map of the field together with a visual representation of a first characteristic of the field. An input device is used to draw a boundary around an area of the display, thereby defining a geographic area of the field. Analysis of a second characteristic of the field which correlates to the defined geographic area is then performed. Typically, a farmer draws a polygon on the display based upon similar characteristic values and calculates crop yield and moisture content within the geographic area defined by the polygon.

41 Claims, 9 Drawing Sheets

| DATA POINT NO. | BU /ACRE | MOISTURE | LONGITUDE | LATITUDE | ... |
|---|---|---|---|---|---|
| 1 | 32.0739 | 17.7 | −88.7291520 | 39.0710720 | |
| 2 | 56.5808 | 18.1 | −88.7291140 | 39.0710720 | |
| 3 | 64.1104 | 17.1 | −88.7290720 | 39.0710740 | |
| 4 | 96.1741 | 16.4 | −88.7290320 | 39.0710760 | |
| 5 | 105.247 | 15.9 | −88.7289890 | 39.0710740 | |
| . | . | . | . | . | |
| . | . | . | . | . | |
| . | . | . | . | . | |

300

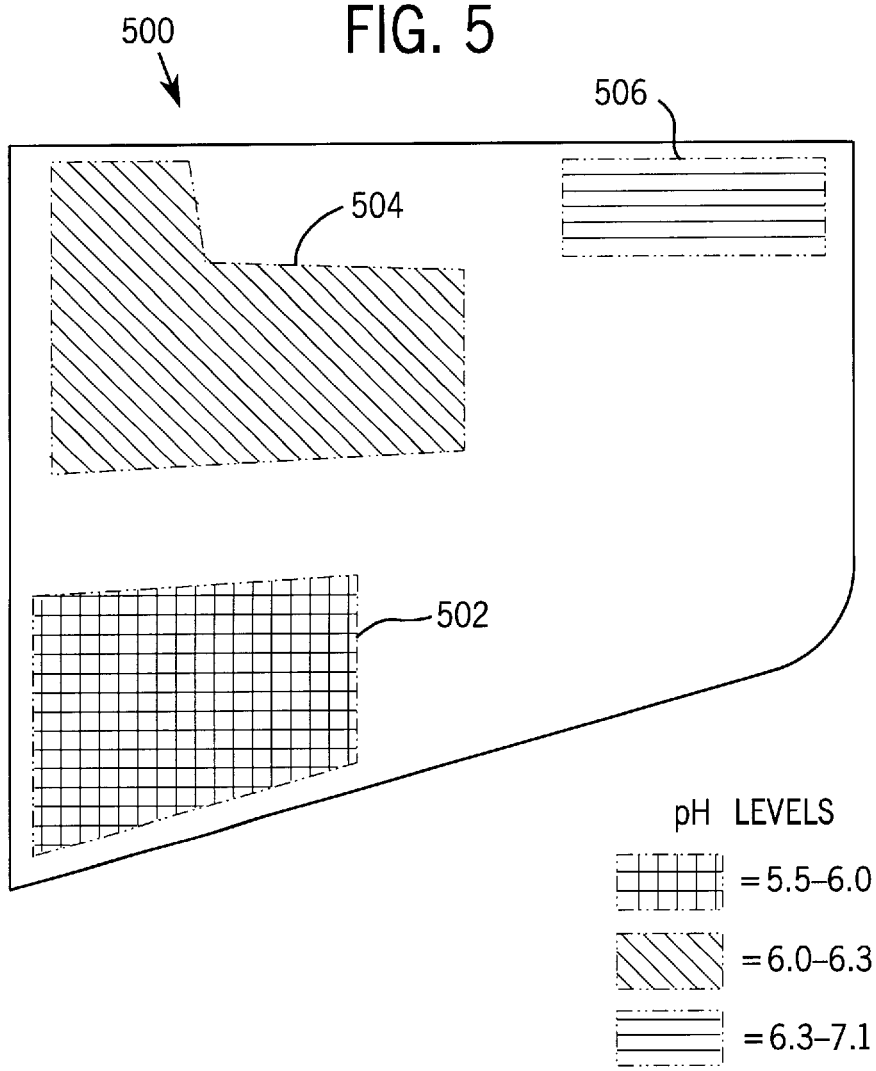

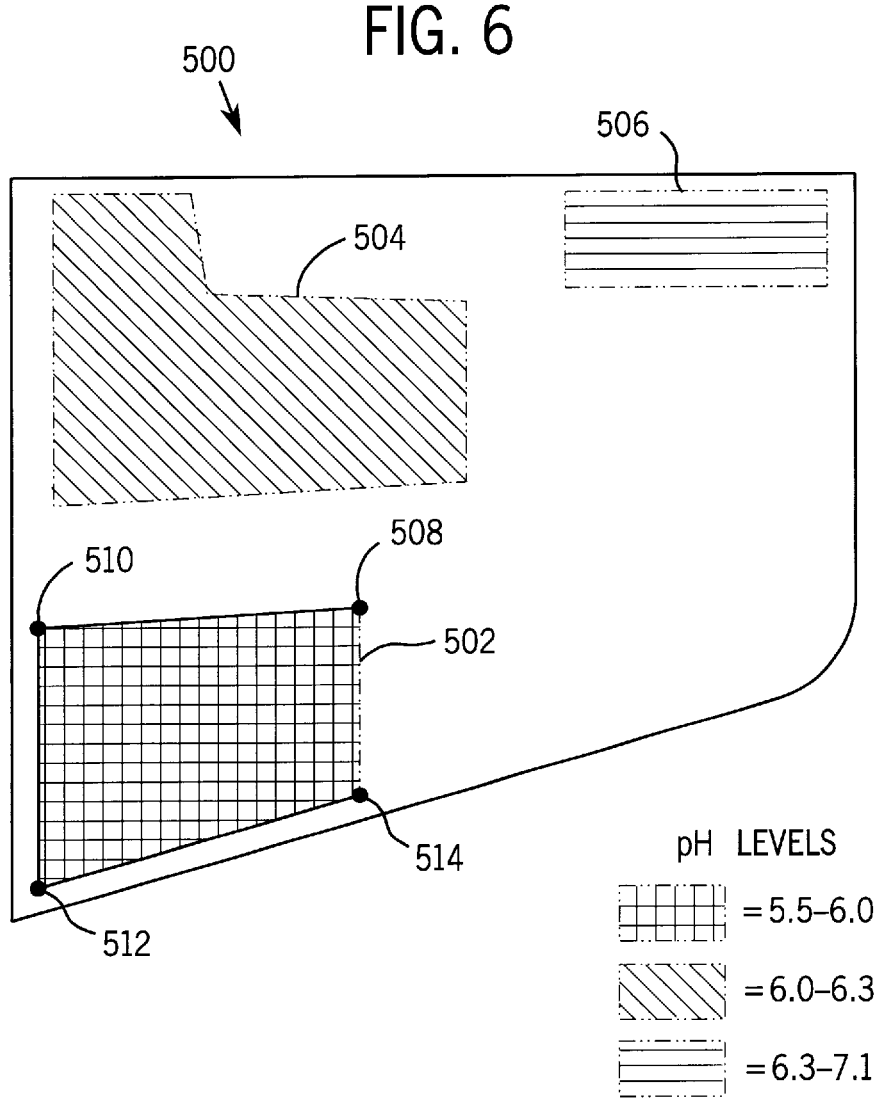

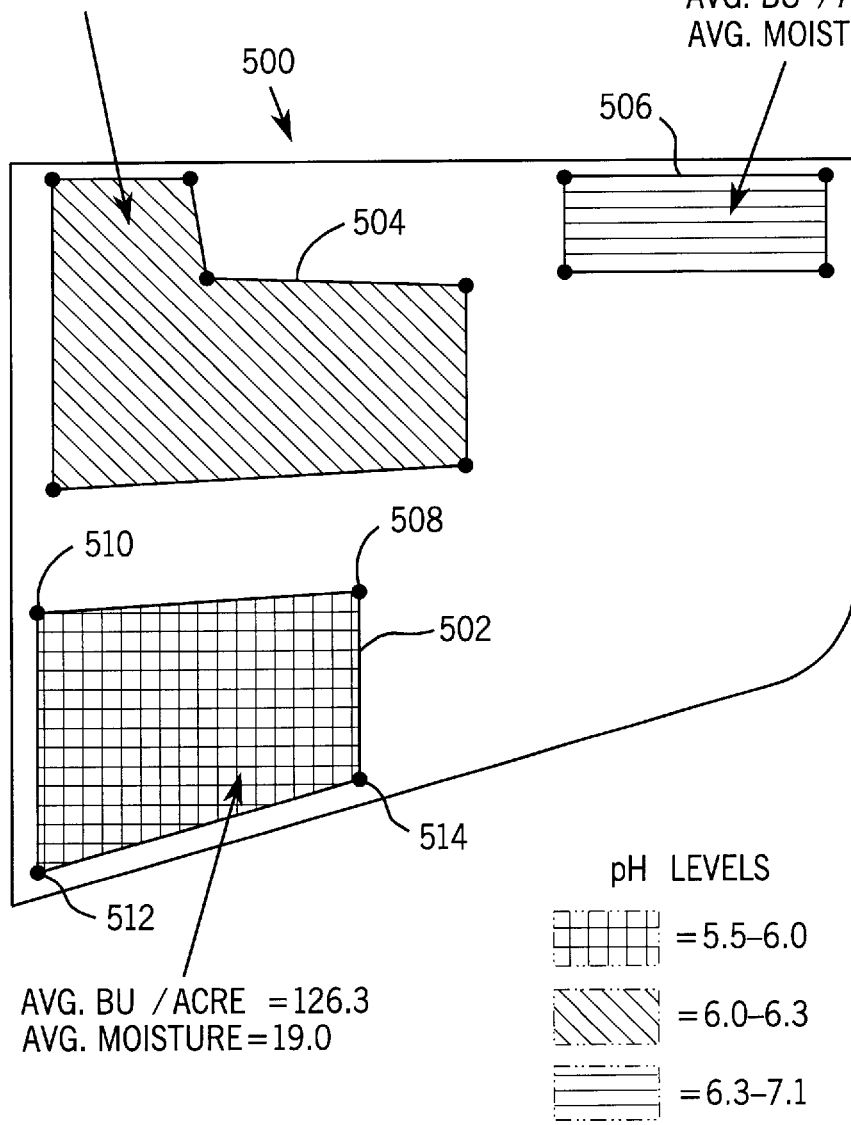

SITE-SPECIFIC HARVEST STATISTICS ANALYZER

FIELD OF THE INVENTION

The present invention relates to the analysis of site-specific farming data. In particular, the present invention relates to a site-specific harvest statistics analyzer for analyzing statistical data for a region of a farming field defined by a boundary based on a set of georeferenced agricultural maps of the farming field.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming.

Management of a field using precision farming techniques requires a farmer to gather information or data relating to various characteristics or parameters of the field on a site-specific basis. Data may be obtained in a number of ways including taking manual measurements, by remote sensing, or by sensing during field operations. A farmer may take manual measurements by visually noting characteristics of a field (e.g., insect infestation) and recording the position as he traverses the field, or by taking soil samples and analyzing them in a laboratory. Remote sensing may include taking aerial photographs of a field, or generating spectral images of the field from airborne or spaceborne multispectral sensors. Spatially-variable characteristic data may also be acquired during field operations using appropriate sensors supported by a combine, tractor or other agricultural vehicle.

Spatially-variable data may relate to the local conditions of the field, farming inputs applied to the field, or crops harvested from the field. For example, the gathered data may represent soil properties (e.g., soil type, soil fertility, soil moisture content, soil compaction or pH), crop properties (e.g., height, crop moisture content or yield), or farming inputs applied to the field (e.g., fertilizers, herbicides, water, insecticides, seeds, cultural practices or tillage techniques used). Other site-specific data may represent insect or weed infestation, landmarks, or topography (e.g., altitude).

Once obtained, it would be desirable to analyze site-specific data to determine the effect that certain characteristics of the field have on each other. For example, it may be desirable to determine the effect that soil fertility has upon yield data. Prescription maps may be generated based upon the results of the analysis, and the generated maps may be used to control variable-rate controllers adapted to apply farming inputs to the field in amounts that vary as a function of the specific location in the field. Variable-rate controllers may be mounted on tractors, spreaders or planters equipped with variable-rate applicators, and may be used to control the application rates for seed, fertilizer, insecticide, herbicide and other farming inputs. Thus, by optimizing application rates based upon an analysis of site-specific data, such as a correlation of yield data with another characteristic, a farmer can optimize amounts of various inputs applied to the field.

The analysis of site-specific farming data, however, can be a complex task involving various characteristics of a field, known and unknown interactions between those characteristics, and the processing of large amounts of site-specific data. In one system, fertilizer is applied to farming fields based upon an expert system which accesses proprietary data tables and performs "complex" calculations in real-time to determine the dispensing rates. Another system includes a communications network which allows farmers to transmit map data to a master system where it is analyzed by an agronomist.

However, current systems do not provide easy-to-use tools for analyzing site-specific data in a flexible manner. The inability to correlate characteristics with each other may prevent the discovery of relationships and interactions between different characteristics that occur within fields. The inability to discover relationships may result in farming inputs being applied in a less than optimal manner, resulting in reduced crop yield or excess environmental damage. The inability to quantitatively analyze the effect of farming inputs on yield may prevent the performance of an informed cost-benefit analysis to determine the optimum approach to take. In addition, the lack of flexible analysis tools may discourage a farmer from "experimenting" by applying certain farming inputs and determining the effect on field characteristics since the farmer may not be able to fully analyze the results. These problems are not solved by existing systems since they do not provide easy-to-use tools for analyzing site-specific data. Existing systems may also include data tables or perform calculations which do not accurately reflect relationships that exist between characteristics of a particular field being farmed.

SUMMARY OF THE INVENTION

Accordingly, the present invention provides a system for allowing a farmer to analyze site-specific data in a flexible manner. The system can be used to correlate different characteristics of a field with each other to discover relationships and interactions which may exist between the characteristics. In particular, the system can correlate spatially-variable characteristics of a field with yield data in order to determine the optimum farming inputs to apply to the field. The system provides a tool to analyze site-specific data which is relatively easy to use and which does not require equipment which may be unavailable to a typical farmer.

One embodiment of the present invention provides a method of analyzing statistical data for at least one given region of a farming field. The method includes the steps of storing a first georeferenced digital map of the farming field including data representative of a first spatially-variable characteristic of the farming field in a digital memory, displaying a visual map of the farming field on an electronic display which includes a visual representation of the first characteristic data, and generating a visually perceivable boundary around an area of the visual map on the electronic display. The method also includes the steps of storing a second georeferenced digital map of the farming field including data representative of a second spatially-variable characteristic of the farming field in the digital memory, and analyzing the data representative of the second characteristic of the farming field which is georeferenced to the area defined by the boundary. At least one result of the analysis is displayed on the electronic display, wherein the result is associated with the bounded area.

Another embodiment of the present invention provides an apparatus for analyzing statistical data for at least one given region of a farming field. The apparatus includes means for providing a first georeferenced digital map of the farming field including data representative of a first spatially-variable characteristic of the farming field, means for displaying a visual map of the farming field on an electronic display which includes a visual representation of the first characteristic data, and means for defining a boundary of a geographic area of the farming field and displaying the boundary on the electronic display. The apparatus also includes means for providing a second georeferenced digital map of the farming field including data representative of a second spatially-variable characteristic of the farming field, means for analyzing the data representative of the second characteristic of the farming field which is georeferenced to the geographic area defined by the boundary, and means for displaying at least one result of the analysis on the electronic display wherein the result is associated with the defined geographic area.

Another embodiment of the present invention provides an apparatus for analyzing relationships between at least one spatially-variable characteristic of a farming field other than yield with a yield map of the farming field. The apparatus includes a digital data memory which stores georeferenced digital maps of the farming field including data representative of the characteristic of the farming field and of yield, an electronic display, and a control circuit coupled to the memory and the electronic display. The control circuit is configured to read the digital maps from the memory and to generate a display signal therefrom which, when applied to the electronic display, generates visible indicia of the farming field and the characteristic data at corresponding locations of the farming field. The apparatus also includes an input device coupled to the control circuit to apply a display location signal to the control circuit, wherein the display location signal causes the control circuit to generate the display signal to draw a polygon around an area of the display, thereby defining a geographic area of the farming field. The control circuit is also configured to analyze the yield data which is georeferenced to the defined geographic area, and to generate the display signal to cause at least one result of the analysis to be displayed in association with the defined geographic area.

BRIEF DESCRIPTION OF THE DRAWINGS

The invention will become more fully understood from the following detailed description, taken in conjunction with the accompanying drawings, wherein like reference numerals refer to like parts, in which:

FIG. 5 shows a map of a farming field displayed on a computer screen which includes a visual representation of a characteristic of the field (e.g., pH of the soil).

FIG. 6 shows the map of a farming field displayed on a computer screen as in FIG. 5, except that four points surrounding a geographic area having similar characteristic values have been marked and lines have been drawn between consecutive points.

FIG. 7 shows the map of a farming field displayed on a computer screen as in FIG. 6, except that the last point marked has been connected to the first point marked to close a polygon defining the geographic area, and the results of an analysis of another characteristic of the field (e.g., average yield and average moisture content) are displayed in association with the geographical area. Also, two other polygons have been defined and analyzed.

DETAILED DESCRIPTION OF THE PREFERRED EMBODIMENTS

Figure 1:
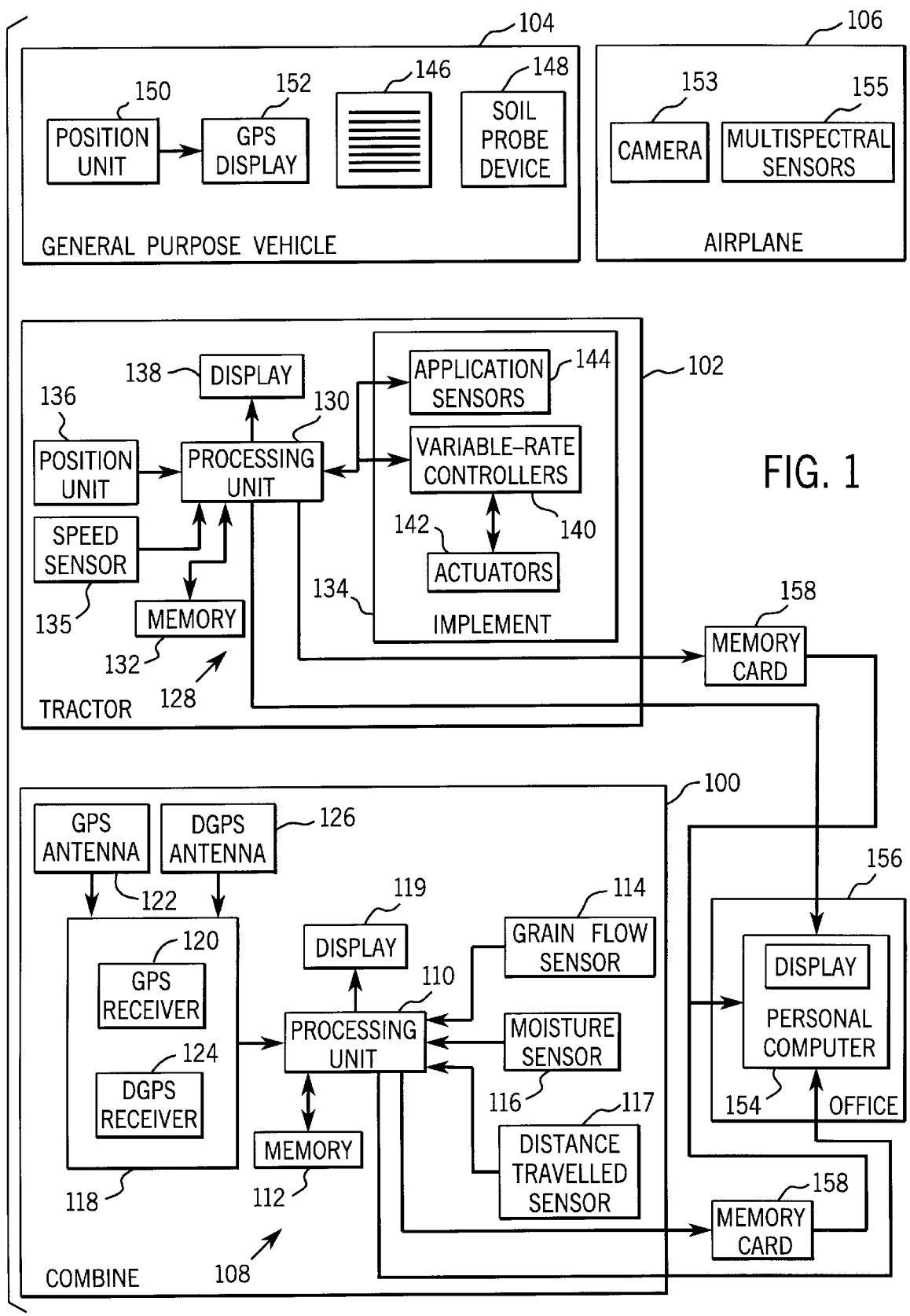
FIG. 1 is a block diagram representing an overview of equipment which can be used to gather and analyze site-specific data representing different characteristics of a farming field.

Referring to FIG. 1, various types of equipment may be used to gather site-specific data representing various characteristics of a farming field. For example, a field may be sampled at different locations while the field is traversed by an appropriately-equipped agricultural vehicle such as a combine 100 or a planter, spreader or tractor 102, or by a general purpose vehicle such as a four-wheel drive truck 104. A farmer may also sample a field at different locations while traversing the field on foot. Also, site-specific characteristic data may be gathered by remote sensing from an airborne vehicle such as an airplane 106 or a spaceborne platform such as a satellite (not shown). Each technique for gathering site-specific data includes circuitry or sensors which determine a characteristic of the field at different locations and a location determining circuit which generates location signals representative of the locations at which the samples were taken.

For example, a farmer may gather site-specific data (e.g., grain flow and grain moisture content data) while harvesting a field of corn using combine 100. Combine 100 is equipped with a data collection system 108 which includes a processing unit 110, a memory 112 (e.g., RAM, hard or floppy disk, PCMCIA memory card, etc.), a grain flow sensor 114, a grain moisture content sensor 116, a distance travelled (speed) sensor 117, a position unit 118, and a display 119 (e.g., CRT, flat screen LCD display, etc.).

Processing unit 110 may be a yield monitor, such as an Ag Leader 2000 combine yield monitor made by Ag Leader Tech. of Iowa, or may be of a type which controls other functions of combine 100 (e.g, header position). Processing unit 110 receives signals representative of grain flow and moisture content from sensors 114 and 116, respectively, and digitizes the signals using a converter circuit such as an analog-to-digital (A/D) converter.

Flow sensor 114 may include a load sensor attached to a steel plate which is struck by grain passing through the clean-grain elevator of combine 100 to measure the force of the grain flow. Moisture sensor 116 may be positioned near the auger tube of combine 100 to measure the moisture content of grain passing over the sensor. Distance travelled (speed) sensor 117 may include a magnetic pickup sensor configured to sense the speed of the wheels or transmission of combine 100, or may include a radar device mounted to the body of the combine. The distance travelled is equal to the product of the vehicle speed and elapsed time. The vehicle speed may also be sensed by calculating the difference between successive position signals received from position unit 118 and dividing by the elapsed time. Processing unit 110 also receives signals from position unit 118 which represent the positions of combine 100 when the grain flow, speed (distance travelled) and moisture content were sampled. Processing unit 110 correlates grain flow and moisture content data with position signals, and stores the data in memory 112. Yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled. The stored data defines georeferenced digital maps wherein each data point is digitized and stored in association with position data. Maps may be referred to as "layers" of data (e.g., pH layers). Maps and status information may be displayed on display 119.

Position unit 118 preferably includes a global positioning system (GPS) signal receiver 120 with an associated antenna 122, and a differential GPS (DGPS) signal receiver 124 with an associated antenna 126. A single integrated antenna may also be used in place of antennas 122 and 126. GPS receiver 120 may, for example, be made by Trimble Navigation Ltd. of California, and DGPS receiver 124 may be made by Satloc, Inc. of Arizona. GPS receiver 120 determines the longitude and latitude coordinates (and altitude) of combine 100 from signals transmitted by the GPS satellite network. The accuracy of the position data is improved by applying correction signals received by DGPS receiver 124. The differential correction signals are used to correct errors present on GPS signals including the selective availability error signal added to GPS signals by the U.S. government. DPGS correction signals are transmitted by the Coast Guard and by commercial services. The Omnistar DGPS system from John E. Chance & Assoc. of Texas, for example, includes a network of ten land-based differential reference stations which send correction signals to a master station which uploads signals to a satellite for broadcast throughout North America. A network of differential GPS towers has been built by Mobile Data Communications of Illinois. Correction signals may also be transmitted from a local base station such as the top of a farm building.

Site-specific data may also be gathered while traversing a field using tractor 102. Tractor 102 is equipped with a data collection system 128 including a processing unit 130, a memory 132, an implement system 134, a speed sensor 135 configured to sense the speed of tractor 102 (similar to sensor 117), a position unit 136 and a display 138. Processing unit 130 may include a processor configured to control the application of a farming input, such as seeds or fertilizer, to the field according to a prescription map or an operator's commands. Processing unit 130 may send commands to implement system 134 which includes one or more variable-rate controllers 140, actuators 142, and application sensors 144. The commanded output rate is a function of the speed of tractor 102 and the desired application rate. For example, an increased speed will require an increased output rate to maintain a constant desired application rate. In response to the commands, variable-rate controllers 140 generate control signals applied to actuators 142 for controlling the application rate of farming inputs. Application sensors 144 provide feedback signals to processing unit 130 to enable closed-loop operation. Examples of variable-rate application systems include a variable-rate planter controller from Rawson Control Systems of Iowa and a variable-rate fertilizer spreader from Soil Teq., Inc. of Minnesota.

A farmer may also gather site-specific farming data while traversing a field in general purpose vehicle 104 or on foot. For example, the farmer may see an area of insect infestation and note the location on a piece of paper 146, or may take soil probes 148 (noting locations) and send them to a laboratory for analysis. The location may be determined using a portable position unit 150 with a display 152, such as a hand-held GPS signal receiver unit. Locations may also be determined in other ways, such as triangulation from landmarks at known locations.

Site-specific data relating to field characteristics may also be gathered remotely using a platform such as airplane 106 or a satellite. The platform may include a camera 153 for photographing the field. The photographs may be georeferenced to the field using the known location of a landmark, or by circuitry which determines the area photographed by camera 153. The platform may also include a spectral sensor 155 such as that used in a system for mapping a field for precision farming purposes (e.g., U.S. Pat. No. 5,467,271).

Still referring to FIG. 1, once data representing spatially-variable characteristics of a farming field is obtained, the data is communicated to a computer system such as computer 154. Preferably, computer 154 is a personal computer or workstation located in the farm's office 156. However, computer 154 could be located in a vehicle such as combine 100 or tractor 102, and may be included in processing unit 110 or 130. Gathered data may be transferred to computer 154 in a number of ways. In a preferred embodiment, data collection systems 108 or 128 include an interface for a removable memory card 158 which can be transported to office 156 and read by computer 154. In one embodiment, data collection systems 108, 128 and computer 154 each include a PCMCIA card reader and memory card 158 is a PCMCIA card. Data may be stored directly on memory card 158 as data is collected, or may be transferred to memory card 158 from memories 112 or 132 after being gathered. Memories 112 and 132 may advantageously be used to back-up data, thereby safeguarding data in the event memory card 158 is damaged or lost. Memory card 158 may also be used to transfer prescription map data generated by computer 154 back to tractor 102. Other data communication interfaces may also be used to transfer data between vehicles 100, 102 and computer 154. For example, vehicles 100, 102 and computer 154 could be linked via a cable carrying RS-232 serial data, or by an RF or infrared data link.

Relatively small amounts of data may be transferred to computer 154 by manually entering data from paper 146 into computer 154. Data may be also be transferred from data collection system 108 or 128 via other storage media such as magnetic or optical disks or tapes. Image data, such as data represented within photographs, may be transferred into computer 154 using a digitizer or scanner (not shown) interfaced to computer 154. The digitizer creates a digital image which may be referred to as a bit map. Alternatively, a photograph could be placed on a digitizer and an input device could be used to trace a boundary around an area of interest. As the last example shows, the characteristic data may consist only of data representing the boundaries of a polygon.

Figure 2:
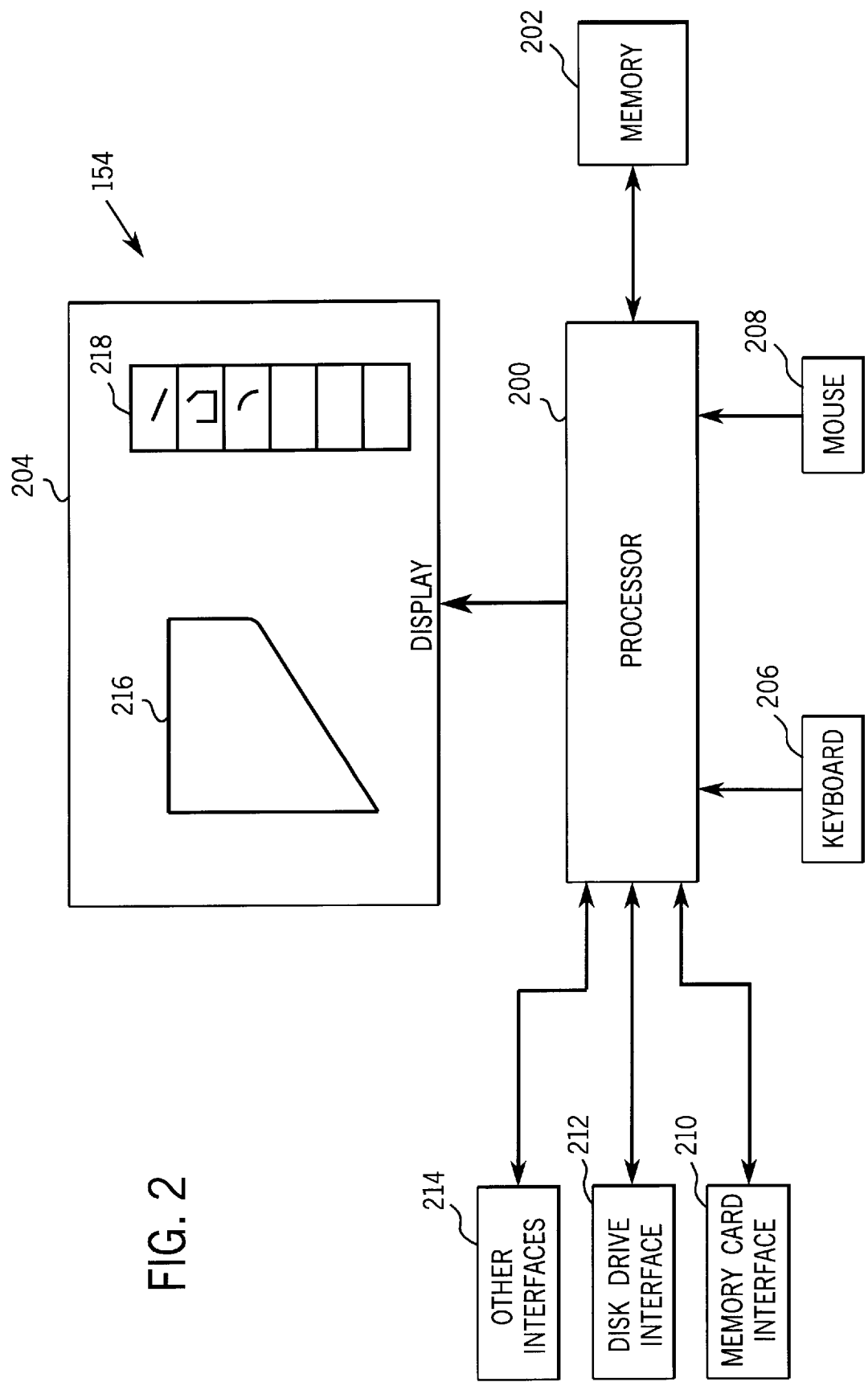
FIG. 2 is a block diagram of the office or portable computer shown in FIG. 1 which can be used to analyze site-specific characteristic data.

Referring to FIG. 2, computer 154 is preferably a programmed personal computer including a processor 200, a memory circuit 202, a color or monochrome display 204, input devices such as a keyboard 206 or a mouse 208, and input/output interfaces such as a memory card interface 210, a hard or floppy disk drive interface 212, and other interfaces 214 (e.g., RF or infrared). An input device such as a joystick light pen or touch screen may also be used. Alternatively, computer 154 may be implemented using dedicated, specific-purpose equipment or hard-wired logic circuitry. Processor 200 may be an x86 or Pentium® microprocessor configured to execute a program stored in memory 202 or on a disk read by disk drive interface 212. Preferably, processor 200 reads precision farming data including position information from memory card 158 using memory card interface 210. Data may also be entered using keyboard 206, mouse 208, disk drive interface 212, or another interface 214.

Processor 200 generates display signals which, when applied to display 204, cause alpha-numeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 3:
FIG. 3 represents a data structure in which a layer of data representing a spatially-variable characteristic of a farming field is stored in memory.

FIG. 3 generally represents the structure in which a layer of site-specific data representing a characteristic of a farming field is stored in memory. The structure may be referred to as a georeferenced digital map, or a layer of data. The structure is preferably implemented using a database 300 (e.g., a geographical information system (GIS) database) represented by the table shown in FIG. 3, wherein each row represents a characteristic data point taken at a location in the field. For example, a layer having 5000 data points is represented by a table having 5000 rows. Columns of information are associated with each data point. For example, the columns shown in FIG. 3 include yield data (bu/acre), moisture content, and the longitude and latitude coordinates at which the data points were sampled. Additional columns (not shown) may include flow rate, GPS time, combine serial number (S/N), field identification, type of grain (e.g., corn), and altitude. The data structure of FIG. 3 represents, for example, a yield layer. Data in the first row (Data Point No. 1) indicates that flow sensor 114 and moisture sensor 116 of combine 100 sensed grain flow corresponding to a yield of 32.0739 bu/acre and a moisture content of 17.7, respectively, at a location defined by longitude and latitude coordinates −88.7291520 and 39.0710720. Similar structures may be used to store other layers of data. For example, a pH layer may include a row for each data point and columns for pH, longitude and latitude.

Georeferenced digital maps, such as shown in FIG. 3, may be provided to computer 154 on memory card 158, or on another storage medium used to transfer data to computer 154. The maps may include data representative of yield, moisture content, or any other characteristic of a field. Data may also be provided to computer 154 using other data structures, or may be provided by manually entering characteristic data with its position information, and processor 200 may restructure the data to provide a data structure similar to that shown in FIG. 3. Other digital map structures may be used which correlate spatially-variable characteristic data with the position in the field where the data was taken.

In general, once georeferenced digital maps of a field have been provided as described above, processor 200 executes a field mapping program which reads data from the maps and causes visual maps of the field to be displayed on electronic display 204. The visual maps may include representations of the characteristic data. For example, if the georeferenced digital map represents a yield layer, the column of yield data may be represented on display 204 at locations determined by the associated longitude and latitude data, thereby forming a yield map.

Characteristic data may be visually represented in several ways. In a preferred embodiment, distinguishable colors represent different ranges of data. For example, the colors red, orange, yellow, green, cyan, blue and violet may represent increasing ranges of average yield. Each range may be based on an average yield for the field selected by the user with green centered at the average yield. For example, each color may represent a range of 5 bu/acre if the user selects an average yield of 50 bu/acre or less, a range of 10 bu/acre if the selected average yield is 50 to 125 bu/acre, or a range of 15 bu/acre if the selected average yield is 125 bu/acre or more. Alternatively, different ranges may be represented by alpha-numeric characters or different light intensity levels. Processor 200 uses the longitude and latitude coordinates associated with each data point and scales them to determine the location in the visual map where the characteristic is displayed.

Figure 4A:
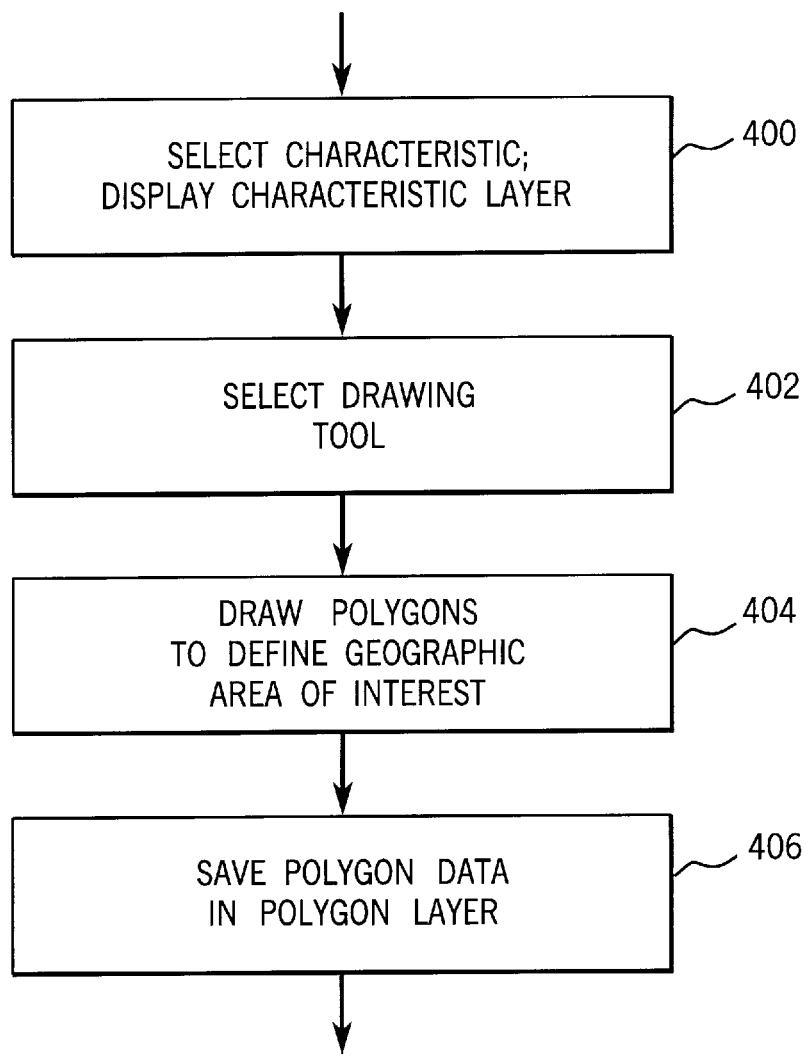
FIGS. 4a and 4b are flow charts representing the steps performed by the computer shown in FIG. 2 to analyze site-specific data.
Figure 4B:
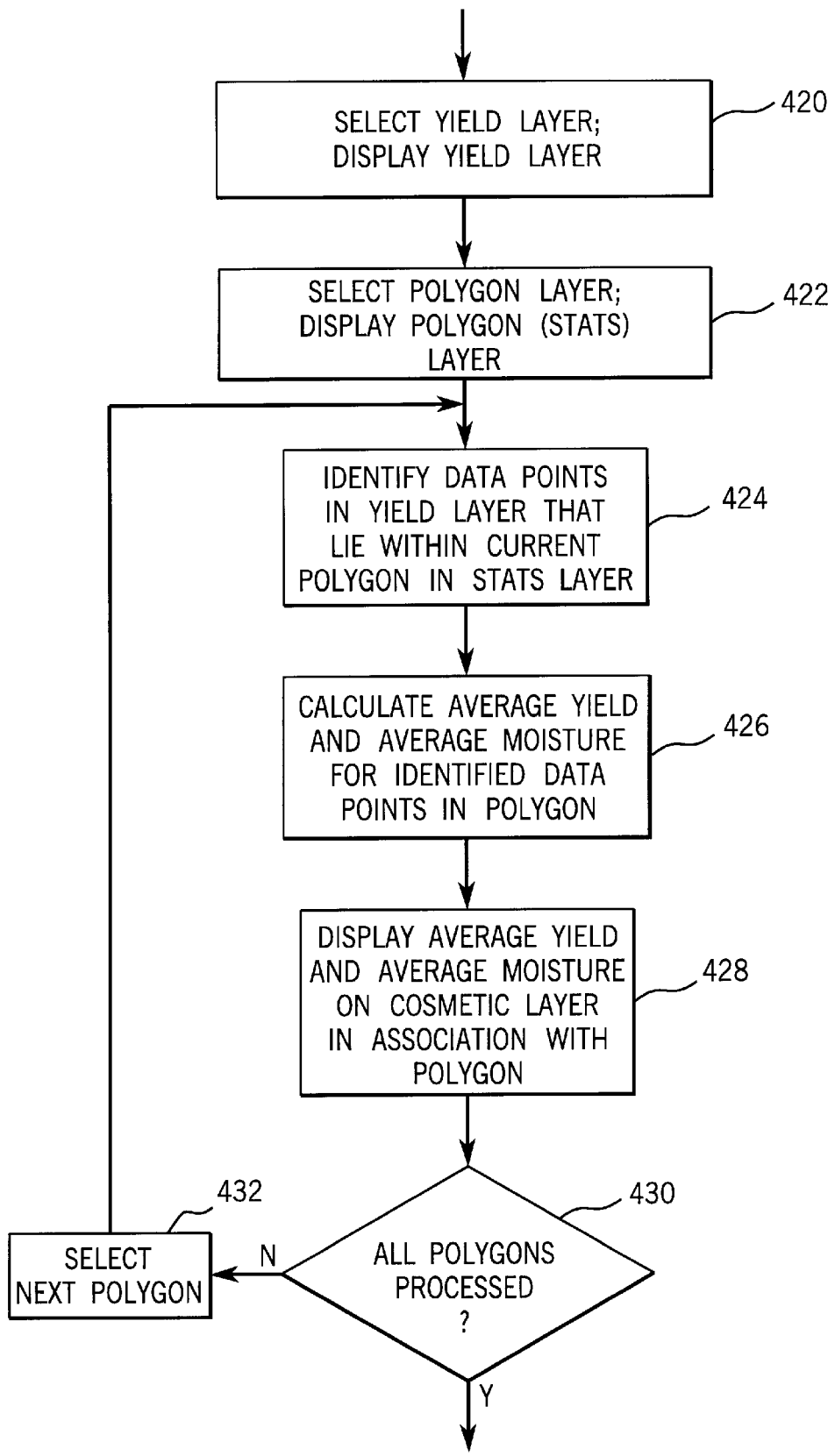

Flow charts representing the steps performed by processor 200 to calculate harvest statistics by layer are generally shown in FIG. 4. The steps shown in FIG. 4A are used to create one or more boundaries or polygons on display 204 to define one or more geographic areas of the field, and the steps shown in FIG. 4B are used to analyze average yield and average moisture within the defined geographic area or areas.

At step 400, a user selects a characteristic to be analyzed which corresponds to a layer of spatially-variable data provided to computer 154. In response, processor 200 generates display signals and applies the signals to display 204 to generate a visual map of the farming field which includes a visual representation of the characteristic. For example, if a user selects the pH characteristic, processor 200 reads each pH data point and its associated longitude and latitude coordinates from the pH layer. The pH data is compared to the ranges of pH to determine which color to display, the longitude and latitude data is scaled to the field size on display 204, and display signals are generated which cause the color to be displayed in the appropriate location. If desired, groups of data points may be averaged during the plotting process (e.g., data points within a block of "X" feet may be averaged) to create a less-cluttered display and to increase the speed of the plotting process.

At step 402, a user selects a drawing tool from toolbox 218. Drawing tools may include paint brushes or tools for drawing geometric shapes or curves including lines, arcs, circles, rectangles, etc. In a preferred embodiment, a user selects a polygon drawing tool which can be used to draw a closed and connected sequence of lines between selected nodes. At step 404, a boundary or polygon is drawn on display 204 by dragging mouse 208 around display 204 and marking each node (i.e., point) surrounding an area of interest by "clicking" the mouse. Processor 200 automatically connects consecutive marked points with lines. The last point is marked by "double-clicking" mouse 208 whereupon processor 200 automatically connects the last point marked to the first point marked, thereby closing the polygon. Other input devices, such as light pens or touch-screens, may be used to draw the polygon. The process may be repeated to draw multiple polygons. Typically, polygons are drawn around areas having the same or similar characteristic data. At step 406, the polygons may be saved on a separate polygon data layer. Alternatively, the polygon data may be saved on the selected layer (e.g., the pH layer).

The steps shown in FIG. 4B are performed after a function referred to herein as a "harvest stats by layer" function is selected. This function may be selected by a user interface command on computer 154, such as selecting a "harvest stats by layer" menu option using mouse 208. At step 420, the user selects a yield layer and the yield layer is displayed. If more than one yield layer is selected before the "harvest stats by layer" function is selected, a user may be asked to select one yield layer. At step 422, a polygon ("stats") layer is selected to be analyzed, and the polygon layer is overlayed on the yield layer on display 204. The polygon layer is the layer for which harvest statistics will be calculated.

At step 424, processor 200 identifies data points in the selected yield layer that lie within each polygon defined in the polygon layer by comparing the longitude and latitude coordinates associated with each data point to the geographic area defined by each polygon. At step 426, processor 200 analyzes the identified data points and calculates summary information for each polygon. For example, processor 200 may calculate average yield and average moisture for the data points within the polygon. At step 428, the results of the analysis (i.e., the summary information) are displayed as an overlay on top of the polygon layer on display 204. Average yield and average moisture may be displayed on display 204 using, for example, alpha-numeric characters. At steps 430 and 432, processor 200 repeats this process for any other polygons defined. If only one polygon is defined, the displayed analysis results are necessarily associated with the polygon. When more than one polygon is defined, the analysis results are associated with the polygons by displaying the results in or near each polygon, attaching the results to each polygon with a line or arrow, or otherwise associating the data with each polygon.

In a preferred embodiment, the display may include multiple layers of data displayed in a certain order. For example, when the "harvest stats by layer" function is selected to analyze polygons drawn in a polygon layer, the polygon layer is displayed in the foreground and the yield and moisture content layers are displayed in the background (i.e., "underneath" the pH map). Processor 200 reads data points that lie within the polygons from the yield and moisture background layers, analyzes the data, and prints the results on a separate cosmetic layer which is always displayed in the foreground of display 204. The cosmetic layer may be edited to clean up the display, and the information in the cosmetic layer may be saved by itself or may be saved into another layer.

The steps for drawing polygons shown in FIG. 4A may be performed at any time after data representing a first characteristic of the field (e.g., pH) is gathered. For example, polygons may be drawn shortly after gathering pH data at planting, or may be drawn only after the harvest. The steps for analyzing the data using the "harvest stats by layer" feature shown in FIG. 4B may be performed after processor 200 is provided with digital maps representing the layer to be analyzed and the yield and moisture data. Separate flow charts (FIGS. 4A and 4B) show that these sequences of steps may be performed at different times. However, the steps shown in FIGS. 4A and 4B may also be combined into a single sequence, or may be performed in a different order. For example, once the data is obtained, the polygons may be drawn and the yields analyzed during a single sequence of steps.

The operation of this analytical tool is explained in reference to the exemplary map of a farming field 500 shown in FIGS. 5–7. Site-specific data related to pH and yield has been gathered and provided to computer 154. For example, soil samples of the field (and the positions at which the samples were taken) may have been taken and sent to a laboratory for a pH analysis. The analysis results were entered into computer 154 and structured to create a geo-referenced digital map including pH data and associated longitude and latitude coordinates. Processor 200 read the digital map to generate display signals and applied the display signals to display 204 to create the visual map of the field shown in FIG. 5. The visual map includes colors (represented by cross-hatching) to show that geographic areas 502, 504, and 506 have pH levels in the ranges of 5.5–6.0, 6.0–6.3 and 6.3–7.1, respectively. For clarity, the display shown in FIGS. 5–7 indicates the pH level only for areas 502, 504 and 506. However, the pH level would typically be shown throughout the entire field (similar to the levels of organic matter shown in FIG. 8).

Referring to FIG. 6, the beginning of a polygon has been drawn around geographic area 502 using mouse 208. A first point 508, a second point 510, a third point 512, and a last point 514 have been marked by dragging mouse 208 to each point and clicking the mouse at each point to surround geographic area 502. Consecutive marked points have been automatically connected. Referring to FIG. 7, after last point 514 is marked, a "double-click" of mouse 208 causes the system to close the polygon by connecting last point 514 and first point 508. FIG. 7 also shows polygons which were drawn to surround areas 504 and 506. Thus, three polygons have been drawn, each defining a geographic area with the same or similar pH values.

In this example, average yield and average moisture content are being analyzed. Thus, computer 154 has been provided with second and third georeferenced digital maps including data representative of grain yield and moisture content at different locations and associated longitude and latitude coordinates. This data was gathered when the field was harvested using a combine.

FIG. 7 shows the display after the "harvest stats by layer" function was selected to calculate average yield (bu/acre) and average moisture content for the pH layer. These statistics are shown on the display in association with areas 502, 504 and 506. Based upon this display, it may be determined that areas 504 and 506 do not show a strong correlation between pH and yield for pH levels between 6.0 and 7.1. However, it may also be determined that area 502 shows a correlation between pH and yield for pH levels below 6.0, wherein yield is reduced. In response, lime may be spread on area 502 to raise the pH level. After the next harvest, the "harvest stats by layer" function and updated yield layer data may be used to determine whether average yield increased in area 502.

In this example, the yield data may have been sensed before or after the pH data was gathered and before or after polygons were drawn to define the geographic areas to be analyzed. For example, a user may have noticed that area 502 had a low level of pH when the field was planted during the spring whereupon he created a map, defined area 502 by drawing a polygon around area 502 and saved the polygon in the pH layer. Then the user waited until after harvest in the fall to determine the effect of the low pH level on yield. Alternatively, a user may have measured pH after harvest, noticed the low pH level at area 502, defined a polygon around area 502, and then used the "harvest stats by layer" function with the yield data from the earlier harvest to determine whether low pH had any correlation with yield. Thus, the analysis may be performed in different temporal sequences.

Another example helps to show the utility of this flexible analysis tool. Scouting of a corn field in the spring may have shown that an area of the field was very wet due to its low elevation. A polygon representing the low-spot was then drawn on a map of the field displayed on computer 154, and the polygon was stored in a digital map. During the fall, the corn was harvested from the field and yield data was collected. Then, the low-spot layer including the polygon was overlayed onto the yield layer by computer 154 and the "harvest stats by layer" function was selected. The results may show that yield in the low-spot area was low since much of the corn in that area washed away. This data may be used to estimate the amount of corn lost and the economic damage due to the drainage problem. An educated cost-benefit analysis may then be performed to decide what option to take in dealing with the problem.

The yield analysis described above may be repeated using other layers of site-specific data which have been gathered and stored in georeferenced digital maps. As described above, the characteristic data may represent a property of the soil (e.g., soil type, soil fertility, water, soil moisture content, soil compaction or pH), a property of the crop (e.g., crop height, crop moisture content, yield or grain flow), or a farming input applied to the field (e.g., fertilizer, herbicide, insecticide, seed or cultural practices or tillage techniques used). The data may also represent insect or weed infestation, landmarks, or topography.

As another example, an aerial photograph of a corn field may be taken. The photograph is input to a process called "registering" wherein a position in the field with known longitude and latitude coordinates is used to orient the aerial photograph on a layer displayed by computer 154. A polygon may be drawn surrounding an area of the field having a certain appearance. For example, a polygon may be drawn around an area where the corn has a relatively light color. The average yield for that area of the field may be calculated using the "harvest stats by layer" function. If the yield is normal, a user may decide not to invest time or money into investigating the cause of the light color. However, if the yield is abnormal, the user may perform an investigation into the cause of the light color. The investigation may show that the light color (and low yield) was caused by insect damage or nutrient deficiency, whereupon appropriate corrective action may be taken.

The appearance of display 204 after "harvest stats by layer" is completed may depend upon whether the polygons were saved in a separate polygon layer or in the selected layer. If the polygons were saved in a separate layer, display 204 may show a yield map in background with the polygons superimposed on top of the yield map, and with the results in the cosmetic layer in foreground. For example, in the display shown in FIG. 8, a polygon layer with four polygons representing different organic matter values has been created and superimposed on top of a yield map. If, however, the polygons were saved in the selected layer, the yield map in the background may be blocked out by the selected layer and display 204 may show a map of the selected data in background with the polygons superimposed on top of the selected data map, and with the results in the cosmetic layer in foreground. Such a display is shown in FIG. 7, described above.

Figure 8:
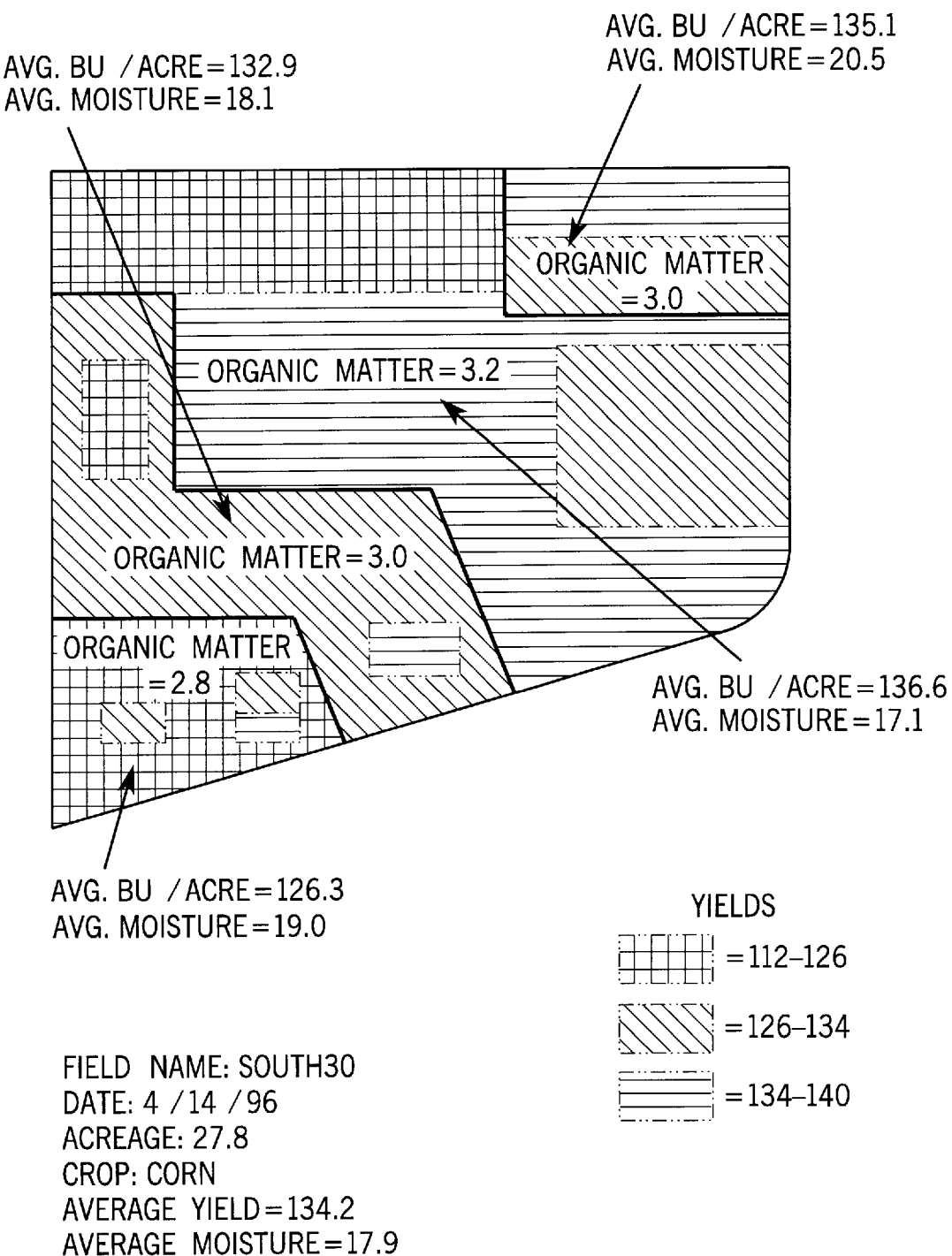
FIG. 8 shows an example display after a "harvest stats by layer" function is performed, wherein a polygon layer is superimposed on top of a yield layer.

As shown in FIG. 8, average yield and moisture content may also be calculated and displayed for the entire field. A farmer may also choose to display other information on display 204 including the field name, date, acreage of the field, and crop type. This information may be displayed on a cosmatic layer and may be stored in any layer.

While the embodiments illustrated in the FIGURES and described above are presently preferred, it should be understood that these embodiments are offered by way of example only. For example, although the description discloses calculating average yield and moisture content within a defined area, other statistical calculations may be performed. The invention is not intended to be limited to any particular embodiment, but is intended to extend to various modifications that nevertheless fall within the scope of the appended claims.

What is claimed is:

1. A method of analyzing statistical data for at least one given region of a farming field, comprising the steps of:

storing a first georeferenced digital map of the farming field including data representative of a first spatially-variable characteristic of the farming field in a digital memory;

displaying a visual map of the farming field on an electronic display which includes a visual representation of the first characteristic data;

generating a visually perceivable boundary around an area of the visual map on the electronic display;

storing a second georeferenced digital map of the farming field including data representative of a second spatially-variable characteristic of the farming field in the digital memory;

analyzing the data representative of the second characteristic of the farming field which is georeferenced to the area defined by the boundary; and displaying at least one result of the analysis on the electronic display, wherein the result is associated with the bounded area.

2. The method of claim 1, wherein the first and second georeferenced digital maps include longitude and latitude coordinates associated with the respective first and second characteristic data.

3. The method of claim 1, wherein the step of storing the second georeferenced digital map includes harvesting crop from the farming field using a combine, sensing the flow of crop harvested at a plurality of positions, receiving position signals associated with the plurality of positions as the field is harvested, and storing data representative of the crop flow and the associated positions in the memory.

4. The method of claim 1, wherein the step of storing the second georeferenced digital map includes harvesting crop from the farming field using a combine, sensing the moisture content of crop harvested at a plurality of positions, receiving position signals associated with the plurality of positions as the field is harvested, and storing data representative of the crop moisture content and the associated positions in the memory.

5. The method of claim 3, further comprising the step of detecting soil type in the field to generate the first characteristic data, wherein the first spatially-variable characteristic is soil type.

6. The method of claim 3, further comprising the step of monitoring a signal from a fertility analyzer to generate the first characteristic data, wherein the first spatially-variable characteristic is soil fertility.

7. The method of claim 3, further comprising the step of monitoring a signal from a soil moisture analyzer to generate the first characteristic data, wherein the first spatially-variable characteristic is soil moisture.

8. The method of claim 3, further comprising the step of monitoring a signal from a soil compaction analyzer to generate the first characteristic data, wherein the first spatially-variable characteristic is soil compaction.

9. The method of claim 3, further comprising the step of monitoring a signal from a pH analyzer to generate the first characteristic data, wherein the first spatially-variable characteristic is pH.

10. The method of claim 3, further comprising the step of monitoring a signal from a variable-rate fertilizer spreader to generate the first characteristic data, wherein the first spatially-variable characteristic is fertilizer applied to the field.

11. The method of claim 3, further comprising the step of monitoring a signal from a variable-rate herbicide spreader to generate the first characteristic data, wherein the first spatially-variable characteristic is herbicide applied to the field.

12. The method of claim 3, further comprising the step of monitoring a signal from a variable-rate insecticide spreader to generate the first characteristic data, wherein the first spatially-variable characteristic is insecticide applied to the field.

13. The method of claim 3, further comprising the step of monitoring a signal from a variable-rate seed planter to generate the first characteristic data, wherein the first spatially-variable characteristic is seed applied to the field.

14. The method of claim 3, further comprising the step of monitoring the cultural practices applied to the field to generate the first characteristic data, wherein the first spatially-variable characteristic is cultural practices applied to the field.

15. The method of claim 3, further comprising the step of detecting insect infestation in the field to generate the first characteristic data, wherein the first spatially-variable characteristic is insect infestation.

16. The method of claim 3, further comprising the step of detecting weed infestation in the field to generate the first characteristic data, wherein the first spatially-variable characteristic is weed infestation.

17. The method of claim 3, wherein the first characteristic of the farming field is landmarks.

18. The method of claim 3, further comprising the step of monitoring a signal representative of altitude to generate the first characteristic data, wherein the first spatially-variable characteristic is altitude.

19. The method of claim 1, wherein the visual representation of the first characteristic data includes a plurality of colors with different colors representing different magnitudes of the first characteristic.

20. The method of claim 1, wherein the visual representation of the first characteristic data includes a plurality of light intensity levels with different levels representing different magnitudes of the first characteristic.

21. The method of claim 1, wherein the step of generating the boundary includes marking a plurality of points surrounding the boundary area and connecting consecutive points.

22. The method of claim 21, wherein, after a last point is marked, the last point marked is automatically connected to a first point marked, thereby closing the boundary.

23. The method of claim 3, wherein the step of performing an analysis includes calculating an average yield for the defined boundary area.

24. The method of claim 4, wherein the step of performing an analysis includes calculating an average moisture content for the defined boundary area.

25. The method of claim 1, wherein the display of the result on the electronic display includes alpha-numeric characters.

26. An apparatus for analyzing statistical data for at least one given region of a farming field, comprising:
means for providing a first georeferenced digital map of the farming field including data representative of a first spatially-variable characteristic of the farming field;
means for displaying a visual map of the farming field on an electronic display which includes a visual representation of the first characteristic data;
means for defining a boundary of a geographic area of the farming field and displaying the boundary on the electronic display;
means for providing a second georeferenced digital map of the farming field including data representative of a second spatially-variable characteristic of the farming field;
means for analyzing the data representative of the second characteristic of the farming field which is georeferenced to the geographic area defined by the boundary; and
means for displaying at least one result of the analysis on the electronic display wherein the result is associated with the defined geographic area.

27. The apparatus of claim 26, wherein the first and second georeferenced digital maps include longitude and latitude coordinates associated with the respective first and second characteristic data.

28. The apparatus of claim 26, wherein the data representative of the second characteristic of the farming field includes yield data.

29. The method of claim 26, wherein the data representative of the second characteristic of the farming field includes moisture content data.

30. The apparatus of claim 28, wherein the first characteristic of the farming field is a soil property selected from the group consisting of soil type, soil fertility, soil moisture content, soil compaction and pH.

31. The apparatus of claim 28, wherein the first characteristic of the farming field is a farming input applied to the field selected from the group consisting of fertilizer, herbicide, insecticide, seed and cultural practices.

32. The apparatus of claim 28, wherein the visual representation of the first characteristic data includes a plurality of colors with different colors representing different magnitudes of the first characteristic.

33. The apparatus of claim 28, wherein the means for defining a boundary of a geographic area includes an input device actuatable to mark a plurality of points surrounding the area on the electronic display corresponding to the geographic area, wherein consecutive marked points are connected.

34. The apparatus of claim 33, wherein, after a last point is marked, the last point marked is automatically connected to a first point marked.

35. The apparatus of claim 28, wherein the means for analyzing includes means for calculating an average yield for the defined geographic area.

36. The apparatus of claim 29, wherein the means for analyzing includes means for calculating an average moisture content for the defined geographic area.

37. The apparatus of claim 26, wherein the display of the result on the electronic display includes alpha-numeric characters.

38. An apparatus for analyzing relationships between at least one spatially-variable characteristic of a farming field other than yield with a yield map of the farming field, the apparatus comprising:
a digital data memory which stores georeferenced digital maps of the farming field including data representative of the characteristic of the farming field and of yield;
an electronic display;
a control circuit coupled to the memory and the electronic display, the control circuit configured to read the digital maps from the memory and to generate a display signal therefrom which, when applied to the electronic display, generates visible indicia of the farming field and the characteristic data at corresponding locations of the farming field; and an input device coupled to the control circuit to apply a display location signal to the control circuit, wherein the display location signal causes the control circuit to generate the display signal to draw a polygon around an area of the display, thereby defining a geographic area of the farming field;

wherein the control circuit is configured to analyze the yield data which is georeferenced to the defined geographic area, and to generate the display signal to cause at least one result of the analysis to be displayed in association with the defined geographic area.

39. The apparatus of claim 38, wherein the digital maps include longitude and latitude data associated with the characteristic data and the yield data.

40. The apparatus of claim 38, wherein the memory circuit includes a removable memory device.

41. The apparatus of claim 38, wherein the control circuit is configured to calculate average yield for the defined geographic area, and the result of the analysis which is displayed includes average yield.

* * * * *